United States Patent [19]

Haeussinger

[11] Patent Number: 5,332,294

[45] Date of Patent: Jul. 26, 1994

[54] BICYCLE HUB FREEWHEEL ASSEMBLY

[76] Inventor: John Haeussinger, 10330 Everell Pl., Santee, Calif. 92071

[21] Appl. No.: 947,795

[22] Filed: Sep. 21, 1992

[51] Int. Cl.$^5$ .............................................. B60B 27/02
[52] U.S. Cl. ................................. 301/110.5; 192/64
[58] Field of Search ......................... 301/110.5, 105.1; 192/46, 48.92, 64

[56] References Cited

U.S. PATENT DOCUMENTS

| | | | |
|---|---|---|---|
| 2,213,165 | 8/1940 | Kurzina, Jr. | 301/110.5 X |
| 4,567,973 | 2/1986 | Butz | 301/110.5 X |
| 4,580,670 | 8/1986 | Nagano | 192/64 |

FOREIGN PATENT DOCUMENTS

| | | | |
|---|---|---|---|
| 777552 | 2/1935 | France | 192/64 |
| 2501124 | 9/1982 | France | 301/110.5 |
| 2516453 | 5/1983 | France | 301/110.5 |
| 2127113 | 4/1984 | United Kingdom | 192/64 |

Primary Examiner—Russell D. Stormer

[57] ABSTRACT

A freewheel assembly has a specialized mounting sidewall which keys to a mating endwall of a bicycle hub so that the freewheel drives the hub directly through positive interengaging keying structure rather than the threaded shaft connection by which conventional, current freewheels are mounted. The keying structure comprises bosses in the hub endwall and corresponding recesses in the sidewall of the freewheel in the preferred embodiment, with screws through the spindle endwall recesses into the bosses. The freewheel gear sprocket spindle also accommodates a smaller sprocket than is commonly usable, and will accommodate multiple sprockets in parallel on a BMX bicycle, with the sprockets being removable and thus separate pieces from the freewheel spindle.

4 Claims, 2 Drawing Sheets

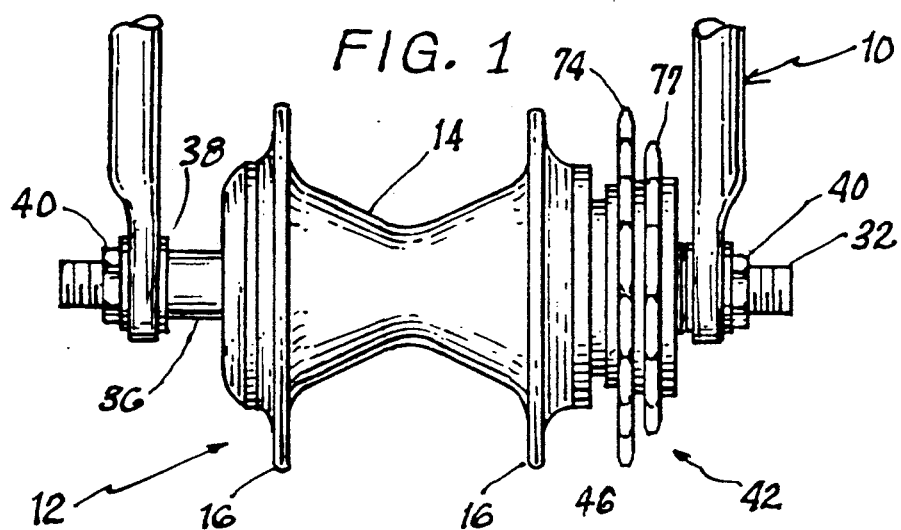
FIG. 1
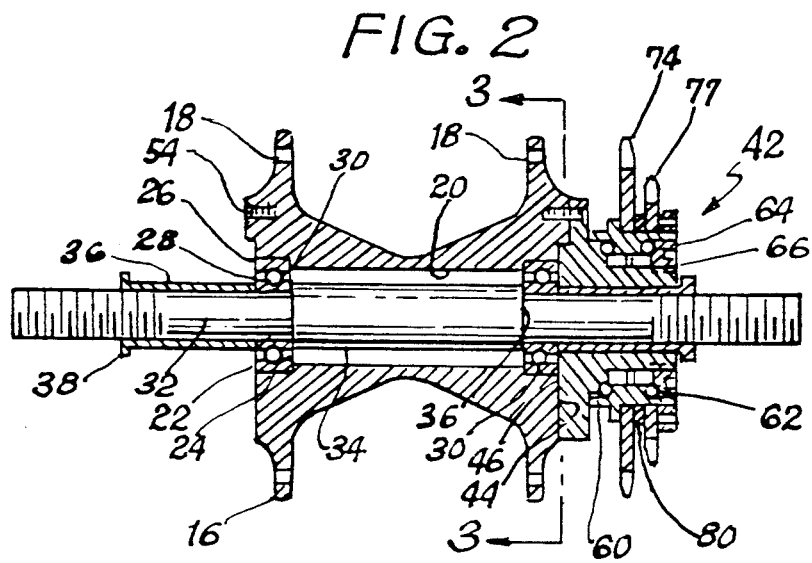
FIG. 2
FIG. 3
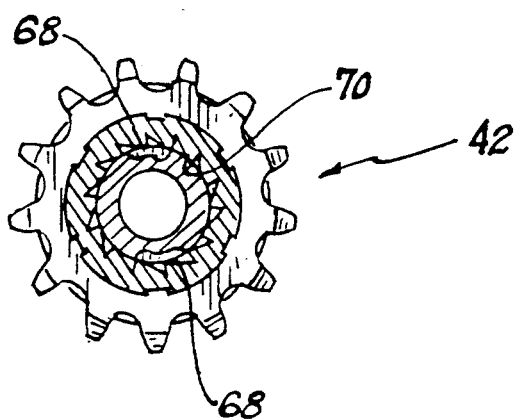

BICYCLE HUB FREEWHEEL ASSEMBLY

BACKGROUND

This disclosure relates to bicycle wheel hubs, and specifically the freewheel mounts for the rear hub and sprocket. It is an advance of some of the concepts set forth by the inventor n U.S. Pat. No. 4,154,327 issued May 15, 1979 for a CONVERTIBLE BICYCLE HUB, and sets forth additional features not considered in that patent.

The bicycle has evolved enormously over the years, and many of its components have become increasingly sophisticated. However, in some respects this has been disadvantageous insofar as increasing sophistication in different directions by different manufacturers has resulted in increasing incompatibility between parts.

In the field of wheel hubs, many manufacturers have their own hub systems which are incompatible with one another, so that a freewheel for one make of bicycle will not work with the hubs of another manufacturer. To make matters worse, most manufacturers have their own specially designed tool that is required to remove the freewheel, and the tool cannot be used on other freewheels. Since riding the bicycle exerts continuous and extreme tightening force at the threaded interconnection, it is difficult or impossible to remove the freewheel with generic tools.

Additionally, generally speaking the front hub of the bicycle cannot be used interchangeably with the rear hub, and the rear hub cannot be reversed, at least not without changing the size of the freewheel mount such as can be done on the so-called "flip-flop" system in which extension collars of different diameters extend from the opposite ends of the hub.

Aside from the incompatibility problem, typically the freewheel assembly of current model BMX racing bicycles mounts a single gear sprocket which is integral with the freewheel assembly. In order to replace the sprocket, for example with one having a different number of teeth, the entire freewheel must be changed. Also, the freewheel mechanism of BMX bicycles generally will not mount more than a single sprocket at a time.

An additional and even more vexing problem is the universal manner in which the freewheel mechanism of current designs is mounted to the hub. In all instances, the hub has a unitary extension sleeve which is externally threaded to accept the freewheel, which is screwed onto the sleeve and increasingly tightens as the freewheel is torqued during bicycle use.

With BMX bicycles used for competitive racing, the stress on the threaded freewheel mounting shaft of the hub, as well the interior threads of the freewheel assembly, is enormous. This leads to frequent stripping of the threads and even breaking of chunks of the sleeve or freewheel mechanism during the most intensive parts of these competitions. In some instances, the threaded freewheel mount also renders the hub unusable as a front hub.

Concerning the bearing mountings on most bicycles, typically the ball bearings of at least one of the two axle bearing rings are retained on the axially outer side by an annular retainer held against the loose bearings by a nut on the axle. The bearings are thus in the compressive force line of the hub mount, and the over- or under-tightening of the nut during assembly or in use can either grind the bearings into the ball races, or create play in the bearing set.

The annular bearing sets are also typically axially outside the main portion of the hub in a hub extension, with the freewheel being threadedly mounted on the extension so that the freewheel axially overlaps the bearings. This requires the freewheel to be large enough in diameter to fit over the bearings, which in turn limits the minimum size of the sprocket that can be used on the freewheel, which is generally a 15-tooth sprocket, although with a specially designed freewheel a 14-tooth sprocket can be used.

SUMMARY

The invention disclosed herein addresses the problems mentioned in the background, above. It is a freewheel that works in conjunction with a truly universal hub which can be used on either the rear wheel or the front wheel (without the sprocket), and which can have the freewheel mechanism mounted on either side of the hub so that the wheel can actually be reversed to even out tire wear, for example, without removing the tire from the rim. The same design can be used on BMX (dirt racing) bikes, mountain bikes or street bicycles.

Another of the worst of the above-mentioned problems is solved by providing a mounting mechanism by which the freewheel has angularly spaced recesses to interfit with bosses which are defined in the specially designed hub to prevent rotation between the freewheel and the hub. There is thus no threaded engagement between the freewheel mechanism and the hub to exert the axial strain on the engaged threads as the freewheel is torqued as occurs currently.

The freewheel is separate from the sprockets themselves, which are slipped onto the freewheel and retained, and in the preferred embodiment two sprockets of different diameter can be mounted on the freewheel rather than one.

BRIEF DESCRIPTION OF THE DRAWINGS

FIG. 1 is a front elevation view illustrating the hub and freewheel assembly mounted together in the rear fork of a bicycle;

FIG. 2 is a transverse section through the hub and freewheel assembly of FIG. 1;

FIG. 3 is a section taken along line 3—3 of FIG. 2 illustrating the interior workings of the freewheel mechanism;

DETAILED DESCRIPTION OF THE PREFERRED EMBODIMENT

Figure 4:
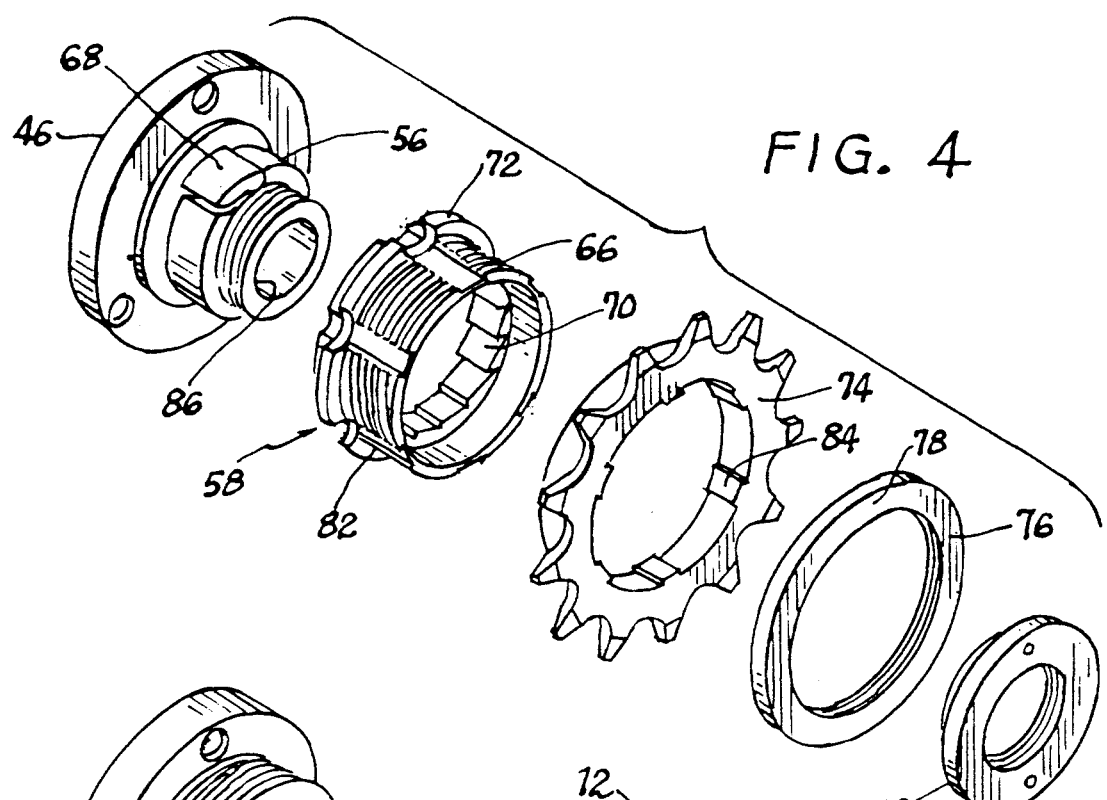
FIG. 4 is an exploded perspective view of the freewheel mechanism.

FIG. 1 illustrates the freewheel shown in its mounting environment in its entirety, mounted to the specialized hub unit 12 and together with the hub, mounted between two tines of a rear mounting fork. The specialized hub for which the freewheel is designed comprises a single piece of aluminum or other appropriate material that is cast, machined, or a combination of the two. The hub is characterized by the strong and stylish V-shaped external contour 14 of the central hub portion, the usual spoke-mounting flanges 16 with spoke-mounting holes 18 therein, and an axial bore 20 which defines the rotational axis of the unit.

These features are of course fairly standard fair in hub unit construction. The distinctions of the disclosed hub construction from conventional hubs begin with the axle and bearing structure. Most or many hubs have bearings mounted alongside of the hub, or in radially expanded hub extensions of the basic hub unit. In the instant invention, the bearings 22 are sealed, and seat in annular grooves 24 defined in the ends of the axial bore 20. Thus the bearings are contained axially inside the hub unit itself, substantially aligned with the spoke flanges.

Figure 6:
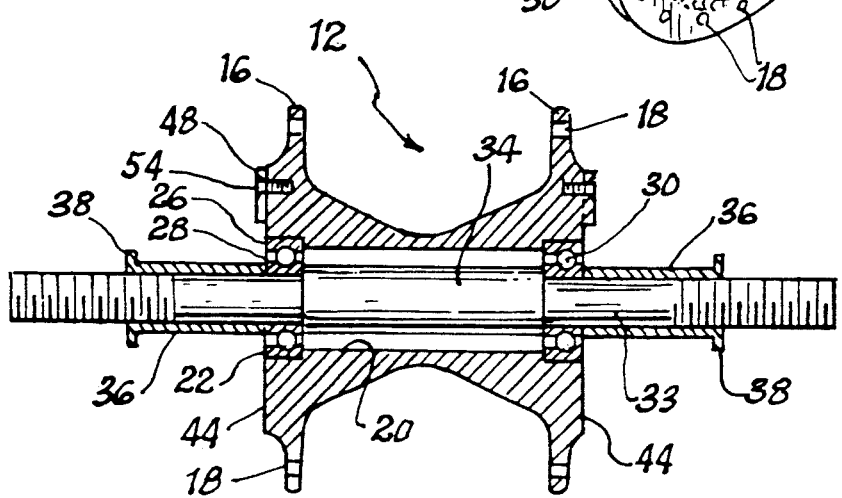
FIG. 6 illustrates the hub arranged for front wheel use without the freewheel; and, FIG. 7 is a perspective view of the hub unit illustrating the endwall boss structure and the spoke flanges, with the center hub portion being omitted.

The sealed bearing units have the typical outer bearing race 26, the inner race 28, and the ball elements 30 captured between the two races. The two bearings, when seated in their seats 24, journal the reduced diameter axle extensions 32 and butt up on their axially inner side against the shoulders 33 of the enlarged central length 34 of the axle. Only the inner race 28 butts up against the central axle portion as can be seen in FIGS. 2 and 6.

Engaged on the axle extensions 32 outside the inner ball races 28 are a pair of sleeves 36 having outwardly directed radial flanges 38 at their outer ends. These sleeves fit snugly on the axle extensions, and the sleeves, together with the axle and the inner ball race of the bearings, remain stationary while the other structure rotates around them.

As can be seen by reference to FIG. 1, compressive forces on the axle nuts 40 have no effect on the alignment of the balls 30 in their races, and can cause neither loosening nor binding of the bearings. The axial compression is delivered directly through the sleeves, the inner ball race and the central shaft of the axle length 34. All of these elements are steel or the equivalent which is strong enough to withstand the compression without buckling, and thus protects other structure from damaged caused by improper wheel mounting.

The sleeves also permit the same basic hub unit 12 to be used in the front or rear wheel as it centers the hub between the tines of the mounting fork irrespective of whether or not there is a freewheel 42 mounted on the hub for unit for use as a rear wheel hub.

Figure 7:
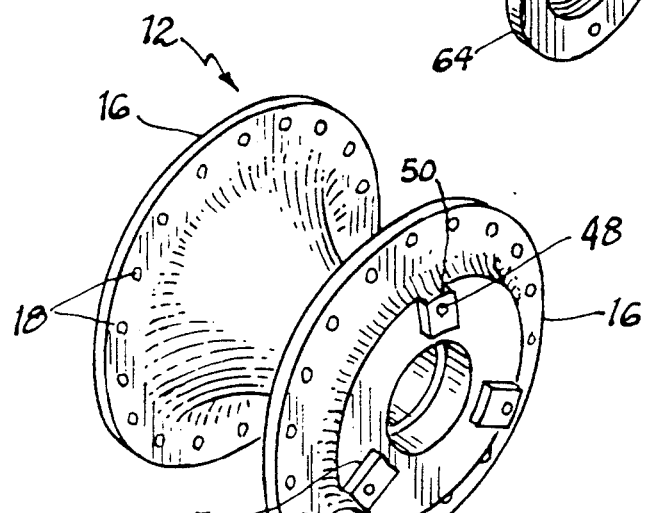

The above description sets forth the environment in which the invention is used. Turning now to the freewheel 42 itself, and the means by which it mounts to the hub and its other advantageous features, the hub unit 12 is provided with keying means which mate with corresponding keying means in the freewheel, directly between either one of the endwalls 44 of the hub unit and the sidewall 46 of the freewheel. Clearly these keying means could take different forms, but in the illustrated embodiment they are formed as three rectangular bosses 48 best seen in FIG. 7, which snugly interfit with the corresponding recesses 50 in the freewheel sidewall by which the freewheel non-rotationally engages the hub. The orientation of the hub bosses are such that each boss has a pair of substantially radially extending walls which are perpendicular to the endwall, and parallel to the rotational axis of the hub. The freewheel recesses conform precisely to the bosses so that interface pairs are formed which do not taper. In other words, torque forces result in being directed orthogonally between these surfaces. This feature minimizes wear between the bosses and recesses as there is no tendency to ride toward, or away from, the hub as the freewheel is torqued, which would be the counterpart of the downfall of the current conventional threaded boss freewheel mounting system.

The freewheel is further secured to the hub unit by means of the screws 52 which pass through suitably placed bores in the sidewall 46, and into screw holes 54 defined through the bosses into the thick portion of the hub unit. No special tool is needed to mount or remove the freewheel, only a screwdriver. Unlike threaded freewheel mounts, continued torquing of the freewheel during normal use does not continually tighten the mounting, making removal difficult.

The sidewall 46 of the freewheel is unitary with a radially inner core portion 56 which extends outwardly along the sleeve 36 as shown in FIG. 2. This core rotates relative to the sleeve, inasmuch as the sleeve is tightly compressed between the fork tines. There is a slight clearance, not shown, between this core and the sleeve so that it is not a frictional bearing surface.

The core mounts the gear ratchet spindle 58, which is unidirectionally rotationally mounted to the core. The ratchet and bearing structure is off-the-shelf and indicated in a somewhat summary fashion in the drawings. The inner freewheel bearings 60 are maintained in place by the gear spindle 58 itself, and the outer bearings 62 are retained by retainer ring 64 which is threaded onto the end portion 66 of the radially inner core 56. Just inside this retainer is a conventional ratchet structure having pawls 68 spring-biased against the annular ring of teeth 70. This ratchet configuration has proven to be reliable and durable and has not been modified in this invention.

The gear mount spindle has a radially inner stop flange 72 to butt against the inside of a sprocket 74. The spindle is threaded from the stop to its distal end, and the sprocket 74 is retained by the retainer ring 76, which is rotated on or off the spindle by a spanner wrench engaging the spanner wrench holes 78.

Although the gear retainer 76 could be rotated up against a single gear butted up against the stop flange, the spindle itself is wide enough to mount a second gear 77, with a spacer 80 between them. Alternatively, a two-gear configuration, manufactured as a unit could be mounted on the spindle to replace the separate sprocket configuration, and would have the identical appearance to that shown in FIG. 2.

The configuration of the radial dimensioning of the freewheel relative to the hub unit and bearing structure is significant. Because the bearings are contained inside the hub rather than outside, the freewheel can be made smaller in diameter as it does not have to overlie the bearings. As shown in FIG. 2, the bore 86 through the core member 56 of the freewheel extends radially inwardly well beyond the surface of the axial bore 20 in the hub unit, all the way down to the radially outer surface of the inner bearing race.

By having such a small diameter, the core permits the mounting of the minimum diameter gear spindle, and thus can accommodate the smallest possible gears, with the minimum number of teeth. The effect of this is to extend the range of the rear sprocket teeth number from 14 to 13. Production of one tooth increases the length of travel of the bicycle for one pedal stroke from about 4 inches to six inches, depending on which crank sprocket is used. Alternatively stated, distance of travel increased by about 7% per cycle and required torque for the same would be increased by the same amount.

For riders, particularly BMX riders who are constantly trying to extend their gear ratios, this is a significant advantage. The spindle will mount gears having any number of teeth from a minimum of 13 to a normal maximum of 22.

To lock the sprockets against rotational motion relative to the spindle, the spindle is provided with six rectilinear (that is, with squared-off edges) axially extended channels 82 in its outer surface. These channels correspond with the similarly shaped tabs 84 on the insides of the sprockets. The rectilinear configuration of the channels and tabs, similar to the bosses and recesses, prevents the riding up of one member on another as the enormous torque forces are applied during tough BMX competition.

Figure 5:
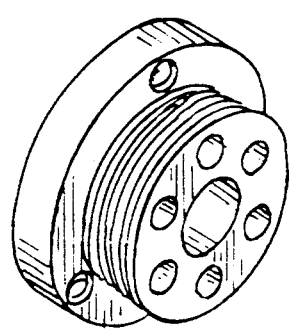
FIG. 5 is a perspective view of an adaptor for adapting a hub of the instant disclosure to a conventional freewheel assembly.

If for any reason it is desired to use a convention sprocket on the hub unit, adapters such as that shown in FIG. 5 can be provided to mount any commercially available freewheel unit.

The hub and freewheel assembly is designed to minimize accumulated wear damage in every way possible. The accumulated wear between the freewheel and the conventional freewheel threaded mount has been eliminated and rotation-preventing surfaces are substantially oriented in planes parallel to the rotational axis so there are no lateral forces to slide one member up against the other, causing accumulated wear leading to part failure.

The invention with these features, coupled with the universality of the invention is expected to make a major impact on hub and freewheel construction. Flexible of application exists not only in the reversibility from left to right or ability to use in the front or rear wheels, but in addition the same assembly can be used in BMX bicycles, mountain bikes or multi-speed road bikes. The standardization will lower inventorying costs as well as production costs and enable groups to carry a smaller inventory of replacement parts on trips.

It is hereby claimed:

1. For mounting on a bicycle hub with an axle bore therethrough defining a rotational axis and having an endwall defining endwall keying structure, a freewheel comprising:
    (a) an annular core having a bore therethrough coaxial with said axial bore when said freewheel is mounted to said hub and having a gear spindle coaxially and unidirectionally rotationally mounted around said core;
    (b) said core defining a sidewall having sidewall keying structure which keys to the endwall keying structure of said hub to positively prevent any rotational motion between said hub and spindle when said freewheel sidewall is mated against an endwall of said hub; and,
    (c) direct fastening means for releasibly fastening said sidewall directly to said endwall substantially independently of any other axially compressive freewheel mounting structure and any axle-concentric threaded mounting connections with other structure between said sidewall and endwall.

2. A freewheel according to claim 1 wherein said direct fastening means comprises screws and said endwall defines axially oriented screw bores therein and said sidewall defines screw holes to align with said screw bores to seat screws engaged therethrough.

3. A freewheel according to claim 2 wherein said keying structure defined by said endwall and said sidewall are axially adjacent one another to define mating pairs, and one of each of said screw bores and holes passes through each of said mating pairs to fasten said endwall to said sidewall directly at points of maximum rotation resistance therebetween.

4. A freewheel According to claim 3 wherein said mating pairs each comprises a boss and a corresponding recess and said screw holes and bores axially skewer substantially centrally through each respective one of said pairs.

* * * * *